Figure 1:
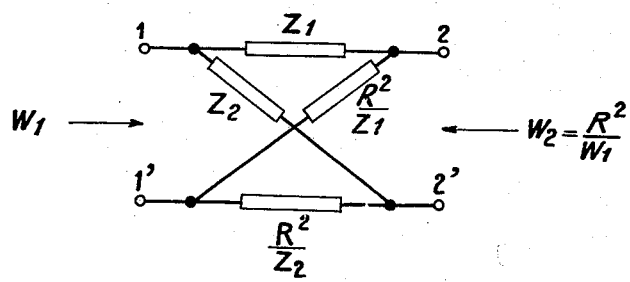

Dec. 30, 1958  J. R. V. OSWALD  2,866,951
LATTICE-TYPE ANTIMETRIC FILTERS
Filed Nov. 30, 1953  4 Sheets-Sheet 1

INVENTOR:
JACQUES R.V. OSWALD
BY:

Dec. 30, 1958  J. R. V. OSWALD  2,866,951
LATTICE-TYPE ANTIMETRIC FILTERS
Filed Nov. 30, 1953  4 Sheets-Sheet 3

INVENTOR:
JACQUES R.V. OSWALD
BY:

Dec. 30, 1958  J. R. V. OSWALD  2,866,951
LATTICE-TYPE ANTIMETRIC FILTERS
Filed Nov. 30, 1953  4 Sheets-Sheet 4

INVENTOR:
JACQUES R.V. OSWALD
BY:

United States Patent Office 2,866,951
Patented Dec. 30, 1958

2,866,951
LATTICE-TYPE ANTIMETRIC FILTERS

Jacques R. V. Oswald, Paris, France, assignor to Compagnie Industrielle des Telephones, Paris, France Application November 30, 1953, Serial No. 395,234

Claims priority, application France December 5, 1952

3 Claims. (Cl. 333—74)

The present invention relates to a particular class of lattice-type reactive networks, those of which the image-impedances $W_1$ and $W_2$ satisfy the relation:

$$W_1 W_2 = R^2$$

R representing a given resistance.

The characteristic impedance, geometrical mean of the image-impedances, is then constant and equal to R.

The quadripoles of which the image-impedances are bound by the Relation 1 are called "antimetric."

Apart from the symmetrical four-pole networks, characterized by $W_1 = W_2$, they constitute a particularly simple class.

However, while the condition of symmetry of the lattice type networks is immediately broken up into two conditions respectively implying the equality of the two opposite groups of branches of the lattice, the condition of antimetry is of a more complex nature. The antimetric lattice type networks which are the object of the present invention are not the most common, but the simplification allowed in their structure permits the development of a theory similar to that of symmetrical networks, and the production of filters offering new and interesting possibilities to the art.

In a lattice network, the impedances of the series branches can be designed by $Z_1$ and $Z_3$, respectively. The impedances of the diagonal branches can be designated by $Z_2$ and $Z_4$, respectively. In such case, the lattice network is antimetric if the following conditions are fulfilled:

$$(Z_{1ou})(Z_{1cc})(Z_{2ou})(Z_{2cc}) = R^4$$

where $Z_{1ou}$ is the network impedance looking into the first pair of terminals if the second pair of terminals is open-circuited; $Z_{2ou}$ is the impedance of the network looking in from the second pair of terminals when the first pair of terminals is open-circuited; $Z_{1cc}$ is the impedance of the network looking in from the first pair of terminals when the second pair of terminals is short-circuited; and $Z_{2cc}$ is the network impedance looking in from the second pair of terminals when the first pair of terminals is short-circuited.

Since the products $(Z_{1ou})(Z_{2cc})$ and $(Z_{2ou})(Z_{1cc})$ are equal, the relation which expresses the antimetric cell can be written as follows:

$$Z_{2cc} = \frac{R^2}{Z_{1ou}}$$

If the impedances $Z_{2cc}$ and $Z_{1ou}$ are replaced by the equivalent values expressed in the terms of the impedances $Z_1$, $Z_2$, $Z_3$, and $Z_4$ of the lattice network, the following expression is obtained:

$$\frac{Z_1 Z_4}{Z_1 + Z_4} + \frac{Z_2 Z_3}{Z_2 + Z_3} = R^2 \left( \frac{1}{Z_1 + Z_4} + \frac{1}{Z_2 + Z_3} \right)$$

or $$(Z_1 Z_4)(Z_2 + Z_3) + Z_2 Z_3 (Z_1 + Z_4) = R^2 (Z_1 + Z_2 + Z_3 + Z_4)$$

this condition is obviously achieved if $Z_1 Z_4 = Z_2 Z_3 = R^2$ which is the simplest case for the antimetric network. The other case which is obtained by writing the first of the above equation $Z_1 Z_3 (Z_2 + Z_4) + Z_2 Z_4 (Z_1 + Z_3)$ corresponds to $Z_1 Z_3 = Z_2 Z_4 = R^2$ or $(Z_1/Z_4 = Z_2/Z_3)$. This last relationship defines a balanced bridge which has an infinite attenuation at all frequencies and accordingly is not of interest as a filter network.

Fig. 1 represents a network of this kind, comprising the adjacent branches $$Z_1 \text{ and } \frac{R^2}{Z_1}; Z_2 \text{ and } \frac{R^2}{Z_2}$$

It is at once clear that the admittance $Y_{1ou}$, seen from the terminals $11'$, when the output terminals are in open circuit, and the impedance $Z_{2cc}$ seen from the terminals $22'$ when the terminals $1$ and $1'$ are short-circuited, are in the ratio $R^{-2}$, which characterizes antimetry. Thus, we have:

(2) $$Y_{1ou} = \frac{1}{Z_1 + \frac{R^2}{Z_1}} + \frac{1}{Z_2 + \frac{R^2}{Z_2}}$$

(3) $$Z_{2cc} = \frac{R^2}{Z_1 + \frac{R^2}{Z_1}} + \frac{R^2}{Z_2 + \frac{R^2}{Z_2}}$$

and as is well-known, it follows that:

(4) $$W^2 = \frac{Z_{2cc}}{Y_{1ou}} = R^2$$

By choosing reactances for $Z_1$ and $Z_2$ a four-terminal network is obtained which has the properties of a filter.

The object of the present invention is precisely the determination of the reactances in order to obtain a particular filter-effect; composition of a low-pass, high-pass, band-pass or band rejection filter, with infinite choice of attenuation frequencies.

For an impedance function having an impedance X with a characteristic impedance R, the term "standardized impedance" represents the quotient $X/R$ and is designated by $x$.

Accordingly, if the image-impedance of the network looking into the terminals $11'$ is designated $W_1$ and the image-impedance looking into the terminals $22'$ is designated—

$$W_2 = \frac{R^2}{W_1}$$

then the corresponding "standardized impedances" are as follows:

$$w_1 = \frac{W_1}{R}, \text{ and } w_2 = \frac{W_2}{R} = \frac{R^2}{RW_1} = \frac{1}{w_1}$$

Similarly, the "standardized impedances" for the network impedances $Z_{1ou}$ and $Z_{1cc}$ are respectively $$z_{1ou} = \frac{Z_{1ou}}{R} \text{ and } z_{1cc} = \frac{Z_{1cc}}{R}$$

Utilizing these notations, the standardized image-impedances of the antimetric lattice network are given by:

(5)
$$w_1 = \frac{W_1}{R} = w_2^{-1} = \sqrt{z_{1ou} z_{1cc}} = \sqrt{\frac{(z_1^2 + 1)(z_2^2 + 1)}{(z_1 + z_2)(1 + z_1 z_2)}} \times \frac{1 + z_1 z_2}{z_1 + z_2}$$

$$= \sqrt{\frac{(z_1^2 + 1)(z_2^2 + 1)}{z_1 + z_2}}$$

The image transfer constant $\theta$ is given by:

$$e^{2\theta}=\frac{Z_{1ou}+w_1}{Z_{1ou}-w_1}=\frac{\sqrt{\frac{(z_1^2+1)(z_2^2+1)}{1+z_1z_2}}+1}{\sqrt{\frac{(z_1^2+1)(z_2^2+1)}{1+z_1z_2}}-1}$$

when, in order to express the attenuation function $q=\text{cth }\theta$:

(6) $$q=\frac{\sqrt{(z_1^2+1)(z_2^2+1)}}{1+z_1z_2}$$

The basic Formulae 5 and 6 make it possible to summarize the conditions which must be satisfied by the reactances $z_1$ and $z_2$, in order to obtain a filter of predetermined properties, thus:

A. In the pass band or bands of the filter $$(z_1^2+1)(z_2^2+1)$$

must be negative, $w_1$ must be real; the result is that, at the frequencies for which the reactance $z_1$ takes the value $j$, the reactance $z_2$ takes the value $(-j)$ and inversely. ($j$ represents, in accordance with the classic notation, the square root of $-1$.) These frequencies are called anticoincidence frequencies. For them $q$ cancels out.

B. In the attenuated band or bands, $$(z_1^2+1)(z_2^2+1)$$

must be positive, $w_1$ being purely imaginary; hence it follows that at the frequencies for which the reactance $z_1$ takes the values $\pm j$ the reactance $z_2$ takes the same value. These frequencies are called coincidence frequencies, for them $w_1$ cancels out.

C. At the cut-off frequencies, which separate two bands in which $w_1$ is respectively real or purely imaginary, only one of the reactances takes the value $\pm j$, the other taking any values differing from the preceding ones. For cutoff frequencies, $w_1$ and $q$ cancel out.

It can therefore be said that the frequencies for which the standard impedances $z_1z_2$ assume the values $\pm j$ or more briefly the points $\pm j$ of these reactances, play, in the theory of antimetric lattice type filters, the same part as the frequencies for which the reactances of the branches of a conventional symmetrical lattice assume the values zero or infinity, in other words the zeros and the poles of said branches.

The preceding rules permit the specification of lattice type filters of different types (low-pass, high-pass, etc.). If we take a priori the frequencies for which one of the standard reactances, $z_1$, for example, takes the values $\pm j$, in other words the points $\pm j$ of $z_1$, the points $\pm j$ of $z_2$ are entirely determined. Now, it is easy to show that a reactance is perfectly defined by the knowledge of its points $\pm j$.

Figure 2:
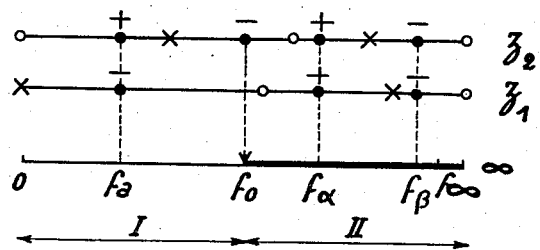
Figure 3:
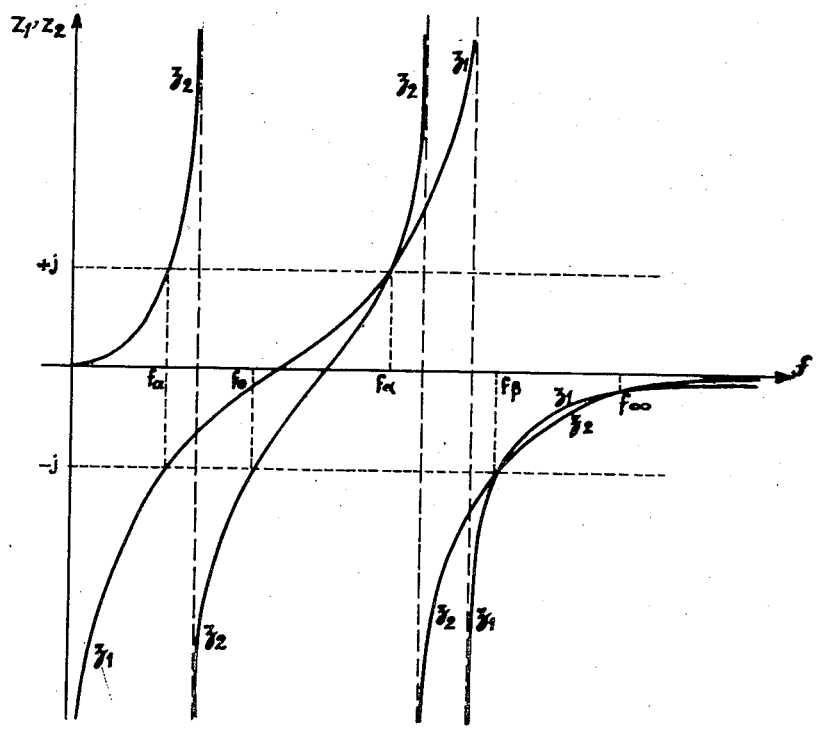

Figs. 2 and 3 represent the distribution of the points $\pm j$ in a low-pass filter. In Fig. 2, a thin line represents the pass-band I, limited by the cut-off frequency $f_0$—marked by the sign V—and a heavy line marks the attenuated band II. Circles and crosses respectively represent the zeros and poles of the standardized reactances $z_1$ and $z_2$, and dots surmounted by + or — signs represent the points $\pm j$. The cut-off frequency corresponds to a point $(-j)$ of $z_2$. For the frequency $f_a$ of the pass band, we find a point $(-j)$ of $z_1$ and a point $(+j)$ of $z_2$ (anticoincidence frequency). The attenuation function $q$ is then zero, as also is the composite attenuation. For the frequencies $f_a$ and $f_\beta$ (coincidence) we find respectively points $+j$, and point $-j$, of $z_1$ and $z_2$. The image impedance $w_1$ is zero (by reason of Equation 5) and the image-impedance $w_2$ is infinity. The composite attenuation is infinity. It is also infinity, as is this time the image attenuation, for the frequency $f_\infty$, corresponding to the third intersection of the curves $z_1$ and $z_2$.

Figure 4:
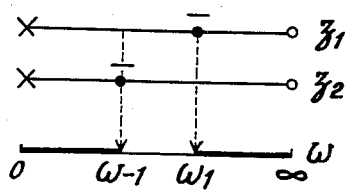

Fig. 4 represents, with the same notations, the reactances of the simplest band-pass filter.

It is always possible to calculate an antimetric lattice type filter, by taking the points $\pm j$ of the reactances $z_1$ and $z_2$. However, this method is not immediately applicable, because the composite attenuation frequencies zero or infinity are not known a priori. It is first of all necessary to determine the standardized functions $w_1$ and $q$ which it is desired to use, and which are defined by the zeros of $w^2{}_1-1$ (perfect adaptation) and of $q^2-1$ (double peaks of attenuation) outside the frequencies 0 and $\infty$. This will often be the simplest method of determining $z_1$ and $z_2$. Moreover, these reactances can easily be expressed as a function of $w_1$ and $q$.

In effect we get from (5) and (6):

(5') $$\sqrt{1-w_1^{-2}}=\frac{1-z_1z_2}{\sqrt{(1+z_1^2)(1+z_2^2)}}$$

and:

(6') $$\sqrt{1-q^{-2}}=\frac{z_1-z_2}{\sqrt{(1+z_1^2)(1+z_2^2)}}$$

hence:

(7) $$q\sqrt{1-w_1^{-2}}=\frac{1-z_1z_2}{1+z_1z_2}$$

$$w_1\sqrt{1-q^{-2}}=\frac{z_1-z_2}{z_1+z_2}$$

The functions $z_1z_2$ and $$\frac{z_1}{z_2}$$

are therefore separate, and if we put:

(8) $$w_1\sqrt{1-q^{-2}}=U, \quad q\sqrt{1-w_1^{-2}}=V$$

$z_1$ and $z_2$ are given by:

(9) $$\begin{cases} z_1=\sqrt{\frac{(1-V)(1+U)}{(1+V)(1-U)}} \\ z_2=\sqrt{\frac{(1-V)(1-U)}{(1+V)(1+U)}} \end{cases}$$

Let us note that:

(10) $$\sqrt{w_1^2-1}=\frac{1-z_1z_2}{z_1+z_2}$$

and

(11) $$\sqrt{q^2-1}=\frac{z_1-z_2}{1+z_1z_2}$$

are rational quantities and represent mutual reactances; this is always the case with $\sqrt{q^2-1}$ for the antimetric four-terminal networks, but not for $\sqrt{w^2{}_1-1}$; this shows the more restrictive character of the type of lattice-type four-terminal networks which are being considered. (The introduction of $\sqrt{w^2{}_1-1}$ and not of $$\sqrt{w_2^2-1}$$

is due to the choice of the denomination of the branches, which is not symmetrical in relation to the two groups of terminals.) If these conditions are satisfied and if $w_1$ and $q$ are conjugated functions, that is to say, functions of which the product and the ratio are reactances, it is possible to show that $z_1$ and $z_2$ are effectively defined as reactances by the Equations 9. It is noted that $U$ and $V$ are only determined to the nearest sign, but the various changes of sign only have the effect of permutating the adjacent or opposite branches of the lattice.

It is therefore sufficient to associate functions $q$ and $w_1$, subject to the previous conditions, and characterizing the type of filter which it is desired to obtain.

For the low-pass filters, the choice must be made from the functions $q=\text{cth }\theta$ which are the functions $w_1$ of the high-pass filters.

The pulsations are standardized by introducing their ratio to the cut-off pulsation, and we put:

(12) $$P=j\frac{\omega}{\omega_0}=\frac{p}{\omega_0}$$

The class of the functions $q$ is defined like the degree of $q^2$ in $p^2$; it is the number of the simple zeros of $(q^2-1)$.

Under these conditions the functions $q$ are given by:

(Class 1) $$q=\frac{\sqrt{P^2+1}}{P}$$

(Class 3) $$q=\frac{\sqrt{P^2+1}}{P}\frac{(1+m)^2P^2+1}{(1+m)^2P^2+2m+1}$$

(Class 5)

$$q=\frac{\sqrt{P^2+1}}{P}\frac{(1+m_1)^2(1+m_2)^2P^4+[2(1+m_1)(1+m_2)+(m_1+m_2)^2]P^2+1}{(1+m_1)^2(1+m_2)^2P^4+[2(1+m_1)(1+m_2)(1+m_1+m_2)-(m_1+m_2)^2]P^2+2(m_1+m_2)+1}$$

The parameters $m$ (or $m_1$, $m_2$) characterize the infinite attenuation frequencies in accordance with the formula:

$$\Omega_{i\infty}^2=\frac{\omega_{i\infty}^2}{\omega_0^2}=\frac{1}{1-m_i^2}$$

The impedance functions $w_1$, which are the attenuation functions $q=\coth \theta$ of the high pass filters, are defined by the following tables:

(Class 1)  $\alpha^*$)  $w_1=\sqrt{P^2+1}$ (Class 3)

$\gamma^*$)  $$w_1=\sqrt{P^2+1}\frac{P^2+(1+\mu)^2}{(1+2\mu)P^2+(1+\mu)^2}=\sqrt{P^2+1}\times\frac{P^2+\alpha^2}{(2\alpha-1)P^2+\alpha^2}$$

(Class 5)

$\epsilon^*$)  $$w_1=\sqrt{P^2+1}\frac{P^4+[\mu_1+\mu_2)^2+2(1+\mu_1)(1+\mu_2)]P^2+(1+\mu_1)^2(1+\mu_2)^2}{(1+2(\mu_1+\mu_2))P^4+[2(1+\mu_1)(1+\mu_2)(1+\mu_1+\mu_2)-(\mu_1+\mu_2)^2]P^2+(1+\mu_1)^2(1+\mu_2)^2}$$

etc.

It is usual to represent by $\alpha$) $\gamma$) $\epsilon$) (Cauer notations) the inverse impedances of those of the above table; it is for this reason that the impedances of said table are represented by the same letter with an asterisk signifying the inversion.

By means of any one of the functions of the first list and any of the functions $w_1$, of the second, to construct a low-pass or high pass filter.

Similar formulae are easily set up for the band-pass and band-rejection filters.

Thus the functions $q=\coth \theta$ of the band-pass filters, which are functions $w$ of the band-rejection filters, are in the form:

(Class 2)  $$q=\frac{\sqrt{(P^2+m_0)(P^2+m_0^{-2})}}{P^2+1}$$

(Class 4)

$$q=\sqrt{(P^2+m_0^2)(P^2+m_0^{-2})}\frac{(1+mm_0)^2P^2+(m+m_0)^2}{(1+mm_0)^2P^4+\left[(1+m^2)(1+m_0^2)+2mm_0\left(m_0^2+\frac{1}{m_0^2}\right)\right]P^2+(m+m_0)^2}$$

In these formulae, the cut-off pulsations, $\omega_1\omega_{-1}$, are defined by:

(14) $$m_0=\sqrt{\frac{\omega_1}{\omega_{-1}}}=\frac{\omega_1}{\omega_0}=\frac{\omega_0}{\omega_{-1}}$$

$P$ being given by:

(15) $$P=j\frac{\omega}{\omega_0}=j\frac{\omega}{\sqrt{\omega_{-1}\omega_1}}$$

The impedance function $w_1$, which are the attenuation functions $q$ of the band-rejection filters, are given by the following expressions:

(Class 2)  $b^*$)  $$w_1=\frac{\sqrt{(P^2+m_0^{-2})(P^2+m_0^2)}}{(m_0\pm m_0^{-1})P}$$

(Class 4)

$d^*$)  $$w_1=\frac{\sqrt{(P^2+m_0^{-2})(P^2+m_0^2)}}{P}\frac{P^2+\alpha^2}{(m_0+m_0^{-1}-2\alpha)P^2+\alpha[2-\alpha(m_0+m_0^{-1})]}$$

etc.

As an example, the specification of some filters is given:

*Low pass filter $3/2\alpha^*\alpha$*

It has the attenuation function $q$ of Class 3 and allows a peak of double attenuation for $$\omega_\infty=\frac{\omega_0}{\sqrt{1-m^2}}$$

and a peak of simple attenuation to infinity. Taking as unity the peaks of double attenuation (which correspond in the ladder-type filters to a complete network, the points of simple attenuation corresponding to the ½ networks) I characterize it by the parameter 3⁄2 for the attenuation. It has the image-impedances $\alpha^*$ and $\alpha$ of the table given above of the impedance functions of the low-pass filters.

The expressions of the characteristic functions are recalled:

(16) $$\begin{cases}q=\frac{\sqrt{P^2+1}}{P}\frac{(1+m)^2P^2+1}{(1+m)^2P^2+2m+1}\\ w_1=\sqrt{P^2+1}\end{cases}$$

Carrying these values to (8) then to (9) it follows that:

(17)
$$\begin{cases}U=\frac{(1-m^2)P^2+1}{1+(1+m)^2P^2},\ \frac{1+U}{1-U}=\frac{(1+m)P^2+1}{m(m+1)P^2}\\ V=\frac{(1+m)^2P^2+1}{(1+m)^2P^2+2m+1},\ \frac{1-V}{1+V}=\frac{m}{(1+m)[(1+m)P^2+1]}\end{cases}$$

and consequently:

(18) $$\begin{cases}z_1=\frac{1}{1+m}\frac{1}{P}=\frac{a^2}{P}\left(a^2=\frac{1}{1+m}\right)\\ z_2=\frac{mP}{(1+m)P^2+1}=\frac{(1-a^2)P}{P^2+a^2}\end{cases}$$

Figure 5:
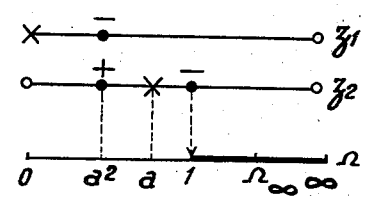
Figure 6:
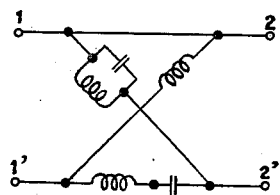
Figure 7:
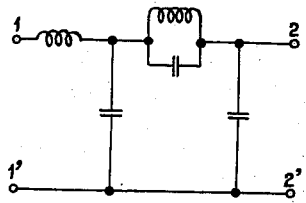

Figure 5 gives the distribution of the points $\pm j$ of this filter, Fig. 6 the structure obtained and Fig. 7 the equivalent ladder-type filter.

*The simplest antimetric band-filter*

Represented, with the preceding notations by $$\frac{2}{2}b^*b$$

with:

$$(19) \begin{cases} q = \dfrac{\sqrt{(P^2+m_1^{-2})(P^2+m_0^2)}}{P^2+1} \\ w_1 = \dfrac{\sqrt{(P^2+m_0^{-2})(P^2+m_0^2)}}{(m_0 m_0^{-1})P} \end{cases}$$

This filter gives simple attenuation peaks at the zero and infinite frequencies.

$$q = \sqrt{(P^2+m_0^{-2})(P^2+m_0^2)} \dfrac{(1+m_0 m_1)^2(1+m_0 m_2)^2 P^4 + AP^2 + (m_0+m_1)^2(m_0+m_2)^2}{(1+m_0 m_1)^2(1+m_0 m_2)^2 P^6 + BP^4 + CP^2 + (m_0+m_1)^2(m_0+m_2)^2}$$

By applying the method indicated, we find:

$$(20) \begin{cases} z_1 = \dfrac{m_0}{P} \\ z_2 = \dfrac{1}{m_0 P} \end{cases}$$

Figure 8:
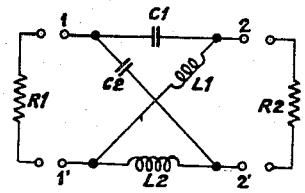

Fig. 4 gives the arrangement of the points $j$ and Fig. 8 represents the lattice-type network obtained with these reactances. This filter is equivalent to the ladder-type ½ network, sometimes called ½ network with $k$ constant, with, however, this difference that the image-impedances $$W_1 \text{ and } W_2 = \dfrac{R^2}{W_1}$$

have the value, in the middle of the band:

$$W_1 = \dfrac{m_0 - m_0^{-1}}{m_0 + m_0^{-1}} R = \dfrac{\omega_1 - \omega_{-1}}{\omega_1 + \omega_{-1}} R$$

$$W_2 = \dfrac{m_0 + m_0^{-1}}{m_0 - m_0^{-1}} R = \dfrac{\omega_1 + \omega_{-1}}{\omega_1 - \omega_{-1}} R$$

Figure 9:
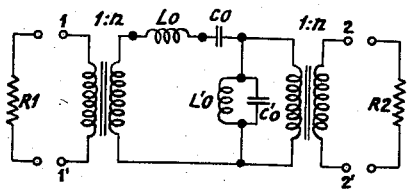

The ratio $$\dfrac{W_2(\omega_0)}{W_1(\omega_0)}, \text{ equal to } \left(\dfrac{\omega_1+\omega_{-1}}{\omega_1-\omega_{-1}}\right)^2$$

is therefore all the higher the narrower the pass-band. The ladder-type half network, completed by the two ratio transformers $$n = \sqrt{\dfrac{\omega_1+\omega_{-1}}{\omega_1-\omega_{-1}}} = \sqrt{\dfrac{m_0+m_0^{-1}}{m_0-m_0^{-1}}}$$

as shown in Fig. 9, is entirely equivalent to the lattice type network of Fig. 8. The elements represented in Figs. 8 and 9 have respectively the values:

$$C_1 = \dfrac{1}{R\omega_1}, \ C_2 = \dfrac{1}{R\omega_{-1}}; \ L_1 = \dfrac{R}{\omega_1}, \ L_2 = \dfrac{R}{\omega_1}$$

$$R_1 = \dfrac{\omega_1-\omega_{-1}}{\omega_1+\omega_{-1}} R = \dfrac{R}{n^2}; \ R_2 = \dfrac{\omega_1+\omega_{-1}}{\omega_1-\omega_{-1}} R = n^2 R$$

for Fig. 8 and $$L_0 = \dfrac{R}{\omega_1+\omega_{-1}}; \ C_0 = \dfrac{\omega_1-\omega_{-1}}{R\omega_0^2}; \ L_0' = \dfrac{\omega_1-\omega_{-1}}{\omega_0^2} R$$

$$C_0' = \dfrac{1}{R(\omega_1-\omega_{-1})}$$

for Fig. 9

This property of a change of impedance modulus, which may be remarkable for narrow-band filters, is common to many lattice-type antimetric band filters and may be of great interest in certain arrangements of selective amplifiers, and more generally in any circuit diagram in which it is desired to avoid introducing transformers of high ratio, which are often difficult to make (coupling defect, interference capacities, etc.).

*Antimetric band-filter* ⅝ $b^*b$

This filter is defined by means of the functions $w_1$ and $q$ given below, with the values of the angular attenuation and infinite image frequencies $$\Omega_{\infty 1}^2, \ \Omega_{\infty 2}^2$$

and the calculation of the auxiliary function U and V previously defined:

$$w_1 = \dfrac{\sqrt{(P^2+m_0^{-2})(P^2+m_0^2)}}{(m_0-m_0^{-1})P}$$

with $$m_0 = \dfrac{\omega_1}{\omega_0} = \dfrac{\omega_0}{\omega_{-1}}, \ \Omega_{\infty 1}^2 = \dfrac{\omega_{\infty 1}^2}{\omega_0^2} = \dfrac{m_0^2 - m_1^2}{1 - m_0^2 m_1^2}, \ \Omega_{\infty 2}^2 = \dfrac{\omega_{\infty 2}^2}{\omega_0^2} = \dfrac{m_0^2 - m}{1 - m_0^2 m}$$

and $$A = (m_1+m_2)^2(m_0^2-1)^2 + 2(m_0+m_1)(m_0+m_2)(1+m_0 m_1)(1+m_0 m_2)$$

$$B = A + (1+m_0 m_1)^2(1+m_0 m_2)^2 + 2 m_0 (m_0-m_0^{-1})^2 (m_1+m_2)(1+m_0^2 m_1 m_2)$$

$$C = A + (m_0+m_1)^2(m_0+m_2)^2 + 2 m_0 (m_0-m_0^{-1})^2 (m_1+m_2)(m_0^2+m_1 m_2)$$

we find $$\dfrac{1-U}{1+U} = \dfrac{m_0(m_1+m_2)}{1+m_0^2 m_1 m_2} \dfrac{(P^2+a^2)(P^2+b^2)}{(P^2+c^2)(P^2+d^2)}$$

$$\dfrac{1-V}{1+V} = \dfrac{m_0(m_0-m_0^{-1})^2(m_1+m_2)(1+m_0^2 m_1 m_2)}{(1+m_0 m_1)^2(1+m_0 m_2)^2} \dfrac{P^2(P^2+c^2)}{(P^2+d^2)(P^2+a^2)(P^2+b^2)}$$

in which $a, b, c, d$, are given by:

$$a^2 + b^2 = \dfrac{(1+m_1 m_2)(1+m_0^2) + m_0(m_0^2+m_0^{-2})(m_1+m_2)}{(1+m_0 m_1)(1+m_0 m_2)}$$

$$d^2 = a^2 b^2 = \dfrac{(m_0+m_1)(m_0+m_2)}{(1+m_0 m_1)(1+m_0 m_2)}$$

$$c^2 = \dfrac{m_0^2 + m_1 m_2}{1+m_0^2 m_1 m_2}$$

$z_1$ shows poles with the pulsations $a$ and $b$, zeros with the pulsations $c$, 0, ∞. $z_2$ is an antiresonant circuit for the pulsation $d$.

The complete specification of the filter is the following:

$$L_1 \dfrac{\omega_0}{R} = (m_0 - m_0^{-1}) \dfrac{1+m_0^2 m_1 m_2}{(1+m_0 m_1)(1+m_0 m_2)} \dfrac{1}{a^2+b^2-\left(c^2+\dfrac{d^2}{c^2}\right)}$$

$$L_1 C_1 = \dfrac{1}{\omega_0^2 C_2}, \ L_1' \dfrac{\omega_0}{R} = (m_0 - m_0^1) \dfrac{m_0^2+m_1 m_2}{(m_0+m_1)(m_0+m_2)}$$

$$C_1' R \omega_0 = \dfrac{(1+m_0 m_1)(1+m_0 m_2)}{(m_0-m_0^{-1})(1+m_0^2 m_1 m_2)}$$

$$L_2 \dfrac{\omega_0}{R} = \dfrac{(m_0^2-1)(m_1+m_2)}{(m_0-m_1)(m_0+m_2)}; \ C_2 R \omega_2 = \dfrac{(1+m_0 m_1)(1+m_0 m_2)}{(m_0^2-1)(m_1+m_2)}$$

Figure 10:
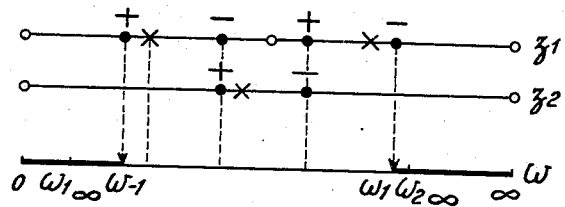
Figure 11:
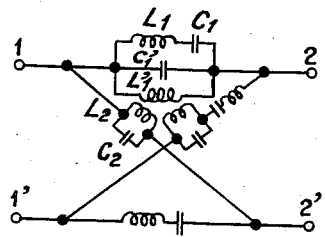

Fig. 10 gives the arrangement of the points $\pm j$ of the reactances $z_1$, $z_2$ and Fig. 11 the circuit diagram of the filter.

Figure 12:
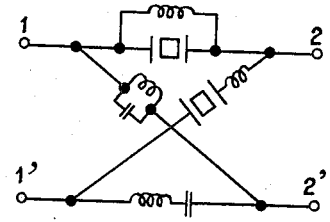

If one of the infinite attenuation frequencies approaches one of the cut-off frequencies, the other remaining fairly distant, this filter can be made by means of two quartz crystals and inductances (Fig. 12). By suitable choice of parameters, a very wide-band filter can be obtained.

Figure 13:
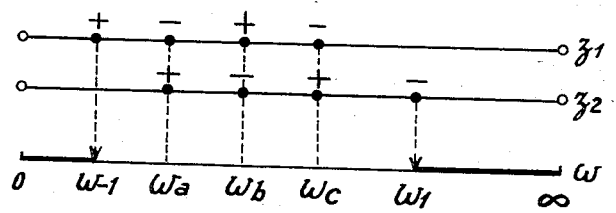
Figure 14:
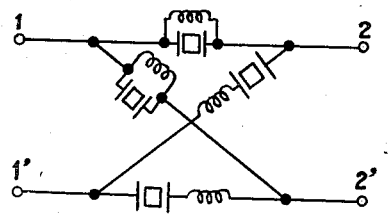

It is also possible to make a wide-band antimetric filter, each branch of which comprises a crystal, the filter being of attenuation Class 4, designated by the notation (⅝ $b^*b$). Figs. 13 and 14 refer to this filter.

It is interesting to observe that the symmetrical filter comprising reactances $z_1 z_2$ of the same structure, would be of Class 3 only.

These examples, of course, are not of a limitative character, the various antimetric lattice type networks, and networks with inverse standardized adjacent impedance being easily determined by means of general principles given in the description.

What I claim is:

1. In an antimetric lattice-type band pass filter having a four-terminal network provided with input and output terminals, a characteristic impedance R and an image impedance $W_1$, in combination, a first pair of adjacent branches connected between one input terminal and the output terminals of the filter and respectively having impedances equal to $Z_1$ and $R^2/Z_1$; and a second pair of adjacent branches connected between another of said input terminals and the output terminals of the filter and respectively having impedances $Z_2$ and $R^2/Z_2$, said impedances of said branches having the following characteristics: (a) at the cut-off frequencies of the filter, only one of the impedances $Z_1$ and $Z_2$ is equal to $\pm jR$; (b) when the attenuation function of the filter is zero, each of the impedances $Z_1$ and $Z_2$ have the same absolute value $\pm jR$ but have opposite signs; and (c) when the image impedance $W_1$ is zero, the impedances $Z_1$ and $Z_2$ each have the same absolute value $\pm jR$ and have the same sign.

2. In an antimetric lattice-type band pass filter having a four-terminal network provided with input and output terminals, a characteristic impedance R, an input image impedance $W_1$, and attenuation frequencies $\omega_{-1}$ and $\omega_1$, in combination, a first pair of adjacent branches connected between one of said input terminals and said output terminals, said branches having impedances equal respectively to $R\omega_1/p$ and $Rp/\omega_1$, where p equals the quantity $j\omega$, $\omega$ equals the frequency of the voltage applied to the input terminals of the filter; and a second pair of adjacent branches connected between another of said input terminals and said output terminals of the filter and respectively having impedances $R\omega_{-1}/p$ and $Rp/\omega_{-1}$.

3. In an antimetric lattice-type band pass filter having a four-terminal network provided with input and output terminals, a characteristic impedance R, an input image impedance $W_1$ and having cut-off frequencies $f_1$ and $f_{-1}$, in combination, a first pair of adjacent branches connected between one of said input terminals and said output terminals, one of said branches having an impedance $Z_1$ and including a resonant circuit and a capacitor connected in parallel with an inductor, the other of said first pair of adjacent branches having an impedance equal to $R^2/Z_1$; and a second pair of adjacent branches connected between another of said input terminals and said output terminals, one of said second pair of adjacent branches including an antiresonant circuit having an impedance $Z_2$, the other of said second pair of adjacent branches having an impedance equal to $R^2/Z_2$, said impedances of said branches having the following characteristics: (a) when the frequency of the voltage applied to the input terminals of the filter is equal to zero and infinity respectively and for at least two frequencies situated on opposite sides of the pass band, the attenuation function of the filter equals 1; (b) when the frequency of the applied voltage equals $f_{-1}$, the impedance $Z_1$ is equal to $jR$; (c) when the frequency of the applied voltage is equal to $f_1$, the impedance $Z_1$ is equal to $-jR$; and (d) for the frequency at which the impedance $Z_2$ of the antiresonant circuit equals $jR$, the impedance $Z_1$ equals $-jR$; for the frequency at which the impedance $Z_2$ of the antiresonant circuit equals $-jR$, the impedance $Z_1$ equals $jR$; said attenuation function of the filter being zero at said last two frequencies.

References Cited in the file of this patent

UNITED STATES PATENTS

| | | |
|---|---|---|
| 1,989,545 | Cauer | Jan. 29, 1935 |
| 2,280,282 | Colchester et al. | Apr. 21, 1942 |
| 2,591,838 | Leroy | Apr. 8, 1952 |

OTHER REFERENCES

Serial No. 345,002, Nagaie et al. (A. P. C.), published May 18, 1943.

Guillemin: Communication Networks, vol. II, published by John Wiley & Sons, New York, in 1935, pp. 378–394.